Patented Sept. 30, 1952

2,612,529

UNITED STATES PATENT OFFICE 2,612,529

HIGHER MOLECULAR WEIGHT FLUORINE-CONTAINING COMPOUNDS

Charles F. Feasley, Woodbury, N. J., assignor to Socony-Vacuum Oil Company, Incorporated, a corporation of New York No Drawing. Application January 12, 1949, Serial No. 70,592

6 Claims. (Cl. 260—653)

This invention relates broadly to a one-step process for the conversion of saturated polyhalogenated organic compounds into fluorine-containing compounds of higher molecular weight, and it is more particularly concerned with the conversion of 1,1,1,3-polyhalogenated organic compounds into fluorine-containing compounds of higher molecular weight.

As is well known to those familiar with the art, anhydrous hydrogen fluoride has been used in substitution reactions involving chlorinated hydrocarbons. Hydrogen fluoride has been added to olefins and acetylene. Mercuric fluoride has been allowed to react with polychlorides, polybromides or polyiodides to prepare fluorine-containing compounds. These latter reactions, however, have not been accompanied by an increase in the number of carbon atoms in the products formed thereby.

Mercuric fluoride has been reacted with alkyl iodides to obtain complex fluorides. Fluorides of mercury have been reacted with iodine-containing compounds to prepare iodofluoro compounds. Halogen exchange has been produced by reacting hydrogen fluoride with polyhalogenated compounds such as benzotrichloride.

It is apparent from an analysis of this phase of the prior art that the addition of hydrogen fluoride to organic compounds, or the substitution of fluorine for other halogens, both by the use of hydrogen fluoride or metallic fluoride, is common under carefully controlled conditions. These processes, however, have never been accompanied by an increase in molecular weight of a saturated halogenated organic compound, i. e., by an increase in the number of carbon atoms.

A study of the prior art also reveals numerous cases where hydrogen fluoride has brought about the condensation of mono- and di-olefins containing no halogen. Metallic fluorides have been used as catalysts in the Friedel-Crafts polymerization of olefins. A common factor in all of these polymerization reactions seems to be the extremely small amount of inorganic fluoride used in proportion to the reactants. An analysis of the products of such reactions has never disclosed that the fluoride occupied any other role than that of catalyst. It has never been found chemically bonded to the product except in very minor amounts.

It has now been discovered that fluorination and an increase in molecular weight of a polyhalogenated, saturated organic compound can be accomplished by a simple, one-step process. It has now been found that 1,1,1,3-polyhalogenated, saturated organic compounds can be converted into fluorine-containing compounds of higher molecular weight by contacting them with a fluorinating agent, under a pressure sufficient to keep the reactants in the liquid phase, and at a temperature sufficient to cause both fluorination and an increase in molecular weight.

Accordingly, it is an object of this invention to provide novel fluorine-containing organic compounds. Another object is to provide a process for producing the same which is simple and economical. A specific object is to provide a one-step process for the conversion of 1,1,1,3-polyhalogenated, saturated organic compounds into fluorine-containing organic compounds of increased carbon chain lengths and molecular weight. Other objects and advantages of the present invention will become apparent to those skilled in the art from the following detailed description.

Broadly stated, the present invention provides a one-step process for the conversion of a 1,1,1,3-polyhalogenated, saturated organic compound having between about four and about thirty carbon atoms per molecule into fluorine-containing compounds of increased carbon chain length and molecular weight, which comprises contacting said organic compounds with a large excess of a fluorinating and condensing agent, in the liquid phase, and at temperatures sufficient to effect fluorination and condensation, i. e., at temperatures varying between about 0° C. and about 150° C., and, preferably, between about 70° C. and about 120° C.

In general, halogenated organic compounds utilizable herein are the 1,1,1,3-polyhalogenated, saturated organic compounds having between about four and about thirty carbon atoms per molecule and, preferably, between five and eighteen carbon atoms per molecule. The organic compound reactant may be a 1,1,1,3-polyhalogenated, branched-chain or straight-chain hydrocarbon, or it may contain an aryl, an alicyclic, or an heterocyclic group. The preferred reactants are the 1,1,1,3-polyhalogenated, straight-chain, saturated hydrocarbons having between about five and about eighteen carbon atoms per molecule, in which at least two of the halogen atoms are halogen atoms other than fluorine, and in which the halogen atom in the 3-position is a halogen other than fluorine. For convenience, the organic compound reactant may be represented by the formula:

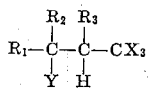

wherein $R_1$ is an organic radical and, preferably, a hydrocarbon radical, $R_2$ and $R_3$ are organic radicals or hydrogen atoms, preferably, hydrogen, Y is chlorine, bromine, or iodine, and X is a halogen atom, of which at least two are halogen atoms other than fluorine. Non-limiting examples of the organic compound reactant are 1,1,1,3 - tetrabromobutane; 1,1,3 - trichloro-1-fluoropentane; 1,1,1,3-tetraiodobutane; 1,1,1-trichloro - 3 - bromopentane; 1,1,1,3-tetrachlorononane; 1,1,1,3-tetrachloroundecane; 1,1,1,3-tetrachlorotridecane; 1,1,1,3-tetrachloroheptadecane; 1,1,1,3-tetrachloro-3-phenylpropane; 1,1,1,3-tetrachloro - 3 - pyridylpropane; and 1,1,1,3-tetrachloro-3-cyclohexylpropane. As set forth hereinbefore, organic compound reactants containing bromine or iodine instead of chlorine, or in combination with chlorine are utilizable, but they are relatively expensive. Accordingly, the preferred reactants are the 1,1,1,3-tetrachloro compounds of the type set forth hereinbefore. These reactants may be prepared in many ways well known in the art.

The reaction involved in this invention is carried out by contacting the organic compound reactant with a suitable fluorinating and condensing agent such as anhydrous hydrogen fluoride, or anhydrous hydrogen fluoride in combination with a metal oxide or metal halide or both. The preferred metal oxide is mercuric oxide, and it, in combination with anhydrous hydrogen fluoride, is the preferred fluorinating and condensing agent. However, hydrogen fluoride may be used in combination with metallic halides such as mercuric fluoride and mercurous fluoride.

In general, the starting material is treated with a large excess of anhydrous hydrogen fluoride. By this it is meant ratios from four to thirty moles of anhydrous hydrogen fluoride to one mole of starting material. The large excess is necessary to induce the fluoride to enter into the reaction as an active reactant and not merely as a catalyst in a condensation process. The large excess coupled with the other conditions of the reaction supplies the fluorine for the halogen exchange that takes place. In some instances, it will be desirable to add a metallic oxide or fluoride or other halide to this reaction mixture. Varying amounts of these oxides or halides may be added ranging from one or two hundredths of a per cent, based on the weight of the starting material, to several moles per mole of the starting material, which amounts, in the case of the fluorides, apparently enter into the reaction and furnish fluorine for the halogen exchange reaction.

The pressure utilized in the reaction should be sufficient to maintain the reactants in a liquid phase. This is accomplished by introducing the reactants into an autoclave, with a suitable pressure control, equipped with an efficient stirrer to agitate the reaction mixture and increase the reaction rate. The rate should not be allowed to become too high. To avoid too violent a reaction, the reactants are cooled at the beginning of the reaction. Heat is applied as the reaction progresses by suitable temperature control of the autoclave and the amount of heat added is only that necessary to carry out the desired reactions. The temperatures employed depend on the reactants used and will generally range from about 0° C. to about 150° C., and, preferably, from about 70° C. to about 120° C. Generally, when mercuric oxide and hydrogen fluoride are present, temperatures from 70° C. to 120° C. will be sufficient to cause the desired reactions, whereas slightly higher temperatures will be necessary when hydrogen fluoride alone is employed.

As in usual chemical processes, the time of reaction is dependent on the temperature of reaction and on the nature of the reactants employed. Higher reaction temperatures require shorter reaction times than are usual for lower temperature reactions. In general, however, the reactions of the present invention are usually complete within a period of time varying between about two hours and about fifteen hours.

The following specific examples are for the purpose of exemplifying the process of the present invention and the products obtained thereof. It is to be strictly understood, however, that the invention is not to be considered as being limited to the specific organic compound reactants or fluorinating and condensing agents, or to the operations and manipulations described in the examples. As will be apparent to those skilled in the art, a wide variety of other reactants, as set forth hereinbefore, may be used to prepare the fluorine - containing compounds of increased molecular weight contemplated herein.

*Example 1*

One hundred sixty-one grams (0.5 mole) of $C_{10}H_{21}CHClCH_2CCl_3$ and 227.4 grams (1.05 moles) of mercuric oxide were charged into a stainless steel autoclave, which was equipped with an efficient stirrer and was jacketed for temperature control. While this mixture was cooled by circulation of a coolant of acetone chilled with solid carbon dioxide, 200 grams (10 moles) of anhydrous hydrogen fluoride were slowly introduced into the cold, agitated mixture. After the final introduction of hydrogen fluoride, which was completed in one hour, the temperature was raised to 100° C. during 1½ hours time and held there for four hours. After cooling, the reaction mixture was flushed from the autoclave with carbon tetrachloride and the solids were removed by filtration. The solids were extracted several times with carbon tetrachloride and the extract added to the main filtrate product. Vacuum distillation of the combined organic material led to a residue, the properties of which are described in Run No. 1 in Table I.

*Example 2*

One hundred grams (0.375 mole) of $C_6H_{13}CHClCH_2CCl_3$ and 174.5 (0.80 mole) of mercuric oxide were stirred and cooled to —65° C. in a stainless steel autoclave. At this temperature 150 grams (7.5 moles) of anhydrous hydrogen fluoride were slowly introduced into the reaction mixture over 30 minutes time. After all the hydrogen fluoride was introduced, the reaction mixture was heated to 105° C. during 45 minutes and held at that temperature for 4 hours. The reaction mixture, after cooling, was run into ice-ice water and washed several times with ice water. The reaction mixture was filtered and the solids extracted with carbon tetrachloride. All the combined organic material was subjected to vacuum distillation to obtain a residue, the properties of which are described as Run No. 2 in Table I.

*Example 3*

One hundred thirty-seven grams (0.36 mole) of $C_{14}H_{29}CHClCH_2CCl_3$ and 227.4 grams (1.05 moles) of mercuric oxide were stirred and cooled to −5° C. in a stainless steel autoclave. Two hundred grams (10 moles) of anhydrous hydrogen fluoride were slowly introduced into the reaction mixture during 30 minutes time at −5° C. After the last hydrogen fluoride introduction, the temperature was raised during 45 minutes to 100° C. and the stirred reaction mixture was held at this temperature for 4 hours. After cooling, the reaction mixture was flushed from the autoclave with carbon tetrachloride into ice-ice water. After washing several times with ice water, the solids were removed from the organic material by filtration. The solids products were again extracted with carbon tetrachloride and all organic products combined, dried, filtered and distilled. The properties of the residue obtained are described as Run No. 3 in Table I.

*Example 4*

Mercuric oxide, 227.4 grams (1.05 moles), and 147 grams (0.5 mole) of crude 1,1,1,3-tetrachloroundecane ($C_8H_{17}CHClCH_2CCl_3$) were stirred and chilled to −20° C. At this temperature 200 grams (10 moles) of anhydrous hydrogen fluoride were slowly introduced during 15 minutes. This reaction mixture was then slowly heated during one hour to 101° C. and held at that temperature for 4 hours. After cooling, the reaction mixture was flushed from the autoclave with carbon tetrachloride into ice-ice water and washed with ice water several times. The reaction mixture after this treatment was filtered and the solids were in turn washed with carbon tetrachloride. All organic material was combined, dried, filtered and distilled. The properties of the resulting residue are summarized as Run No. 4 in Table 1.

*Example 5*

Two hundred grams (10 moles) of anhydrous hydrogen fluoride and 100 grams (0.375 mole) of 1,1,1,3-tetrachlorononane were charged into a 2-liter Monel-lined autoclave and rapidly heated to 99° C. at which temperature they were held for 12 hours at a maximum gauge pressure of 200 pounds per square inch. The reaction mixture was discharged from the autoclave into ice-ice water and this organic material was washed several times with ice water, was dried, filtered and distilled. The residue has properties as summarized in Run No. 5 in Table I.

TABLE I

*Products from polyhalides, mercuric oxide and hydrogen fluoride*

| Run No. | Halogen Reactant | | | | Mercuric Oxide | | Hydrogen Fluoride | | Time, Hours | Temperature, °C. |
|---|---|---|---|---|---|---|---|---|---|---|
| | Formula | Molecular Weight | Grams | Moles | Grams | Moles | Grams | Moles | | |
| 1 | $C_{10}H_{21}CHClCH_2CCl_3$ | 322.15 | 161 | 0.5 | 227.4 | 1.05 | 200 | 10.0 | 4 | 100 |
| 2 | $C_6H_{13}CHClCH_2CCl_3$ | 266.05 | 100 | 0.375 | 174.5 | 0.80 | 150 | 7.5 | 4 | 105 |
| 3 | $C_{14}H_{29}CHClCH_2CCl_3$ | 378.26 | 137 | 0.36 | 227.4 | 1.05 | 200 | 10.0 | 4 | 100 |
| 4 | $C_8H_{17}CHClCH_2CCl_3$ | 294.10 | 147 | 0.5 | 227.4 | 1.05 | 200 | 10.0 | 4 | 101 |
| 5 | $C_6H_{13}CHClCH_2CCl_3$ | 266.05 | 100 | 0.375 | | | 200 | 10.0 | 12 | 99 |

| Residue From Run No. | Boiling Point, °C. | Pressure, mm. | Wt. of Residue, Grams | Saponification Number | Norwood Bromine Number | Percent F | Percent Cl | Pour Point, °F. | Viscosity in Centistokes | | Viscosity Index | Molecular Wt. | Sp. Gr. of Residue |
|---|---|---|---|---|---|---|---|---|---|---|---|---|---|
| | | | | | | | | | 100° F. | 210° F. | | | |
| 1 | >144 | 1 | 13 | 247 | 21.9 | 6.1 | 26.7 | <−30 | 44.06 | 6.64 | 112.5 | | 1.0905 |
| 2 | >105 | 3 | 30 | | | 23.8 | 4.1 | | 301.7 | 16.17 | 38.5 | 589 | |
| 3 | >125 | 2 | 61 | 124 | 19.1 | 10.7 | 11.6 | −20 | 76.5 | 9.72 | 113 | 614 | |
| 4 | >117 | 2.5 | 38 | | | 10.4 | 20.9 | | 58.88 | 7.05 | 80.3 | 654 | 1.112 |
| 5 | >80 | 2 | 14 | | | 2.2 | 7.0 | | | | | 765 | |

It will be apparent that a wide variety of fluorinated organic compounds of high molecular weight can be prepared by the process of the present invention. These high-boiling, non-distilled products are mixtures of a number of high molecular weight fluorine-containing compounds. The molecular weight values indicate that the products contain between about 2 and about 7 times the number of carbon atoms present in the saturated halogenated starting material. Fluorine and chlorine analyses indicate a variation in the relative amount of halogen exchange which has taken place. Bromine number determinations indicate that some of these final products contain one or more double bonds per molecule.

These products have good viscosity indices and relatively low pour points, properties which render them especially useful as synthetic lubricants. They may also be used as hydraulic fluids and as addition agents to mineral lubricating oils to impart oiliness properties and film strength thereto, for the purpose of extreme pressure lubrication.

Although the present invention has been described in conjunction with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. Compounds of increased molecular weight, consisting of the residue obtained by contacting a 1,1,1,3-polyhalogenated paraffinic hydrocarbon having between about 4 and about 30 carbon atoms per molecule with a large excess of anhydrous hydrogen fluoride, in the liquid phase, and at temperatures varying between about 0° C. and about 150° C. to produce a reaction product, and removing distillable matter from said reaction product under vacuum distillation conditions.

2. Compounds of increased molecular weight, consisting of the residue obtained by contacting a 1,1,1,3-polyhalogenated straight chain paraffinic hydrocarbon having between about 4 and about 30 carbon atoms per molecule with a large excess of anhydrous hydrogen fluoride, in the liquid phase, and at temperatures varying between about 0° C. and about 150° C. to produce a reaction product, and removing distillable matter from said reaction product under vacuum distillation conditions.

3. Compounds of increased molecular weight, consisting of the residue obtained by contacting 1,1,1,3-tetrachlorotridecane with a large excess of anhydrous hydrogen fluoride, in the liquid phase, and at temperatures varying between about 0° C. and about 150° C. to produce a reaction product, and removing distillable matter from said reaction produce under vacuum distillation conditions.

4. Compounds of increased molecular weight, consisting of the residue obtained by contacting 1,1,1,3-tetrachloroheptadecane with a large excess of anhydrous hydrogen fluoride, in the liquid phase, and at temperatures varying between about 0° C. and about 150° C. to produce a reaction product, and removing distillable matter from said reaction product under vacuum distillation conditions.

5. Compounds of increased molecular weight, consisting of the residue obtained by contacting 1,1,1,3-tetrachlorononane with a large excess of anhydrous hydrogen fluoride, in the liquid phase, and at temperatures varying between about 0° C. and about 150° C. to produce a reaction product, and removing distillable matter from said reaction product under vacuum distillation conditions.

6. Compounds of increased molecular weight, consisting of the residue obtained by contacting 1,1,1,3-tetrachloroundecane with a large excess of anhydrous hydrogen fluoride, in the liquid phase, and at temperatures varying between about 0° C. and about 150° C. to produce a reaction product, and removing distillable matter from said reaction product under vacuum distillation conditions.

CHARLES F. FEASLEY.

REFERENCES CITED

The following references are of record in the file of this patent:

FOREIGN PATENTS

| Number | Country | Date |
| --- | --- | --- |
| 576,190 | Great Britain | Mar. 22, 1946 |

OTHER REFERENCES

Henne et al., Jour. Am. Chem. Soc., vol. 65, pp. 2362–3 (1943).